United States Patent
McDermott et al.

(10) Patent No.: US 6,938,239 B2
(45) Date of Patent: Aug. 30, 2005

(54) AUTOMATIC GOPHER PROGRAM GENERATOR

(75) Inventors: Andrew McDermott, Swindon (GB); Christopher Cherrington, Swindon (GB); Alister Roberts, Swindon (GB)

(73) Assignee: Wind River Systems, Inc., Alameda, CA (US)

( * ) Notice: Subject to any disclaimer, the term of this patent is extended or adjusted under 35 U.S.C. 154(b) by 649 days.

(21) Appl. No.: 10/124,843

(22) Filed: Apr. 18, 2002

(65) Prior Publication Data

US 2003/0200525 A1 Oct. 23, 2003

(51) Int. Cl.[7] .................................................. G06F 9/44
(52) U.S. Cl. ...................... 717/100; 717/106; 717/124; 717/140; 715/736; 715/338
(58) Field of Search ................................ 717/100, 104, 717/106, 107, 140, 124, 112, 143; 719/328; 715/738, 736

(56) References Cited

U.S. PATENT DOCUMENTS

| | | | | |
|---|---|---|---|---|
| 5,267,175 A | * | 11/1993 | Hooper ......................... | 716/18 |
| 5,987,517 A | * | 11/1999 | Firth et al. ................... | 709/230 |
| 6,029,002 A | * | 2/2000 | Afifi et al. ................... | 717/131 |
| 6,102,969 A | * | 8/2000 | Christianson et al. ....... | 717/146 |
| 6,212,575 B1 | * | 4/2001 | Cleron et al. ................ | 719/328 |
| 6,460,058 B2 | * | 10/2002 | Koppolu et al. ............. | 715/738 |

OTHER PUBLICATIONS

TITLE: Collaborative Gopher design and management: A case study in library.computer center cooperation, author: Barger et al, ACM, 1994.*
TITLE: Network Servers and Java, author: Franco, IEEE, 1997.*

* cited by examiner

*Primary Examiner*—Chameli C. Das
(74) *Attorney, Agent, or Firm*—Davidson, Davidson & Kappel, LLC

(57) ABSTRACT

A system and method for automatically generating a gopher program is provided. The system invokes a debugger and loads a type library into the debugger. The type library containing information regarding each data type used in a program. The system reads each line of a command file, wherein the command file is comprised of literal text and one or more predefined instructions. For each predefined instruction read, the system calls a corresponding function in the debugger and the debugger returns a numerical offset value based upon information in the type library. The system copies the each line of the command file to an output file, with each predefined instruction replaced with its corresponding offset value.

35 Claims, 2 Drawing Sheets

AUTOMATIC GOPHER PROGRAM GENERATOR

BACKGROUND

Computer systems typically include software (computer programs) and hardware (the physical components), such as a central processing unit (CPU) that stores and executes software, a monitor to display output and a keyboard and mouse to accept input commands from a user, as a simple example. Complex systems include thousands of computer systems connected by a network with mass storage devices and any number of peripherals, i.e., printers, scanners, back-up systems, modems.

An operating system is a collection of system programs that allow users to run application software, such as word processors, spreadsheet programs and e-mail software on a specific set of hardware, or platform. The operating system acts as an interface between hardware, the users, and software by abstracting the real hardware of the system to present a virtual machine. The core of an operating system is generally referred to as its 'kernel', a software module that manages interaction between and among hardware and software components, resource allocation and memory access and storage.

When developing software applications for computer systems with minimal resources and I/O capabilities, the development usually occurs on a "host" system, separate from the intended "target" system, in an integrated development environment (IDE). The environment includes a number of software tools, each with a specific functionality useful for development of the application. Often during the development process, the host system needs information about the state and condition of various aspects of the target system. For example, the host system may need information regarding the type and internal state of a message queue which contains messages from system components reflecting the state of the system.

Target state information may be retrieved by reading data stored in kernel objects on the target. A gopher program is one method used to retrieve information from a kernel object by accessing a specific part of a kernel object, retrieving the information stored in that part, and returning the results in a data stream which is commonly referred to in the art as a "tape". An example of an IDE that uses gopher programs is the Tornado® Development Environment by Wind River Systems, Inc. of Alameda, Calif.

The Tornado® Inspector is a software tool within the environment that allows the user to browse a variety of target system kernel objects by sending gopher programs to the target to extract and return certain information in a tape, or stream of data. For each kernel object that can be inspected a corresponding gopher program needs to be written.

SUMMARY

A system and method for automatically generating a gopher program is provided. The system invokes a debugger and loads a type library into the debugger. The type library contains information regarding each data type required to retrieve desired state information from a target computing environment. The system reads each line of a command file, wherein the command file is comprised of literal text and one or more predefined instructions. For each predefined instruction read, the system calls a corresponding function in the debugger and the debugger returns a numerical offset value based upon information in the type library. The system copies each line of the command file to an output file, with each predefined instruction replaced with its corresponding offset value.

A method for automatically generating gopher programs is provided in accordance with an embodiment of the present invention. A type library with information on the size and structure of a plurality of data types compiled with debug information to produce a type library binary image. The plurality of data types include primitive data types and compound data types. The type library binary image is fed to the debugger. An input command file with pre-defined instructions, e.g., a command or macro, and literal text is parsed. As the file is parsed, the pre-defined instructions are identified and a corresponding function in the debugger is called to retrieve a field size and a field position from the type library binary image to calculate a specific offset value of a field in one of the compound data types. The specific offset value is substituted for the pre-defined instruction in the input command file to produce a gopher program with the literal text and the specific offset value.

A gopher program generator is provided in accordance with another embodiment of the present invention. The generator comprises a type library binary image, an input command file, a set of pre-defined instructions, and a script. A debugger is provided with a set of functions, where each of the functions corresponds to one of the pre-defined instructions. The script, which implements the generator, is constructed and arranged to compile with debug information to produce the type library binary image, feed the image to the debugger and parse the input command file for one of the pre-defined instructions in the set. The type library binary image includes information regarding each data type of interest. It should be noted that the input command file includes other data, literal text, besides the pre-defined instructions that is not modified. When a pre-defined instruction is identified, its corresponding function is called to retrieve a field size and a field position from the type library binary image to calculate a specific offset value of a field in a compound data type. The specific offset value is substituted for the pre-defined instruction in the input command file to produce a gopher program that includes the literal text and the specific offset value substituted for the pre-defined instruction.

A system for generating gopher programs is also disclosed comprising a processor and a data storage device operably connected to the processor, the data storage device including a program executable by the processor to execute the steps of the method of the present invention.

In accordance with other embodiments of the present invention, computer readable media are provided which have stored thereon computer executable process steps operable to control a computer to implement the method described above.

DETAILED DESCRIPTION

Figure 1:
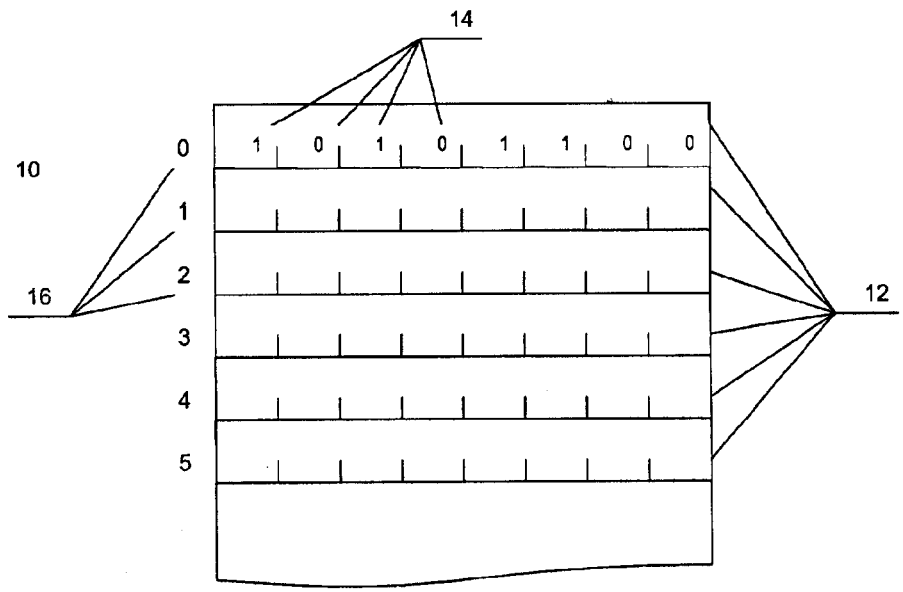
FIG. 1 shows a graphical representation of a microchip and data stored thereon.

For purposes of this detailed description, familiarity with the gopher scripting language as implemented in the Tornado® IDE is presumed. Detailed discussion of the gopher language is provided in Tornado® 2.0 API Programmer's Guide, available from Wind River Systems, and in WIPO publication no.: WO 98/09208, the contents of which are expressly incorporated herein by reference.

Manually generating a gopher program to extract data from a kernel is both time consuming and error-prone. It also requires a deep understanding of both the host toolchain and target architectures. Any change that affects kernel data structures requires existing gopher programs to be reviewed.

q" and defined as type "struct" (in C, a user-defined data structure) in the first and second lines. In the lines that follow, the fields of the data structure are defined first with their type, "int" (integer) and then names, e.g., options, maxMsgs, maxMsgLength, etc. The fields are examples of primitive data types and the data structure, which is user-defined, is an example of a compound data type that includes not only primitive types, but compound types as well (the "msg_q" variable)

TABLE 1

Data structure.

| typedef struct msg_q | | /* MSG_Q */ |
|---|---|---|
| { | | |
| struct msg_q | *next; | /* next message */ |
| int | options; | /* message queue options */ |
| int | maxMsgs; | /* max number of messages in queue */ |
| int | maxMsgLength; | /* max length of message */ |
| int | maxMsgsQueued; | /* max number of messages queued */ |
| int | sendTimeouts; | /* number of send timeouts */ |
| int | recvTimeouts; | /* number of receive timeouts */ |
| } MSG_Q; | | |

If any part of a gopher program needs modification, the entire program must be re-created.

A method for creating a gopher program is provided in accordance with an embodiment of the present invention. The method includes the steps of reading and parsing a command file. The command file includes a mixture of literal text and predefined instructions (commands). Prior to parsing the command file, a debugger is started and a type library is loaded. This type library contains information about the size and structure of all data types to be used. Generally, there are two kinds of data types, primitive data types and compound data types. Primitive data types are defined by the particular programming language, for example, "int" and "char" types in C. Compound data types are user-defined, e.g., data structures in the programming language C, and include primitive data types and sometimes, other compound data types. As the parser reads the command file, literal text is copied directly to the output gopher program. For each predefined instruction encountered, a corresponding function in the debugger will be called which will return an appropriate numerical value based upon the information in the type library. This numerical value will be copied to the output gopher program in place of the predefined instruction.

An exemplary implementation of the system and method according to an embodiment of the present invention is presented herein as it would operate in the Tornado® IDE. It should be noted that the principles and concepts disclosed herein may be applied to the use of gopher programs on any platform.

The mechanism for reading arbitrary data structures in the Tornado environment is the WTX (Wind Tool Exchange) Application Programming Interface (API), and specifically a C function (for example) entitled 'wtxGopherEval( )'. This function accepts a gopher program and forwards it to the target system for execution. The function also returns the gopher results in a "tape"(i.e., data stream).

As an example, assume the data structure in Table 1 is an object from which information is to be retrieved via wtxGopherEval( ). The object of Table 1 is entitled "msg_

To construct a gopher program for retrieving information from the object of Table 1, it is first necessary to identify which fields information will be extracted from. If, for example, the program were to return the maximum number of messages in the MSG_Q object, the gopher program would be designed to access and retrieve the value in the field "maxMsgs".

To understand how gopher programs retrieve information, a simple explanation of how information is stored in computer memory is appropriate. Computers store information in digital form, i.e., ones (1) and zeroes (0). FIG. 1 shows a graphical representation of a memory, generally indicated by reference numeral 10. This particular memory 10 includes storage locations 12, each comprising eight storage cells 14. Each cell 14 holds one bit of information, i.e., a "1" or "0", and each location holds eight bits, referred to as one byte. Each location 12 has an address 16 for access and retrieval of the information stored therein.

When computer software is created, it is first written in a programming language. The completed program is converted, or compiled, into a language that computers understand. When compiled, programs are also checked for mistakes and faults (bugs) so they can be removed. This process is known as debugging.

Each field within a compound data type such as a data structure has a certain size, determined by the processor and compiler used. For example, the size of an "int" (integer) field on a Intel Pentium® X86 processor would be 4 bytes when its data structure is designed and implemented in the C programming language and compiled with the Gnu compiler. Changing the compile would change the storage size for the data structure fields, even if the same processor were used. The reverse is true as well, changing the processor while using the same compiler changes the storage sizes for the data fields.

Assuming the above configuration of processor (Intel x86) and compiler (Gnu) for the data structure in Table 1, each field is four bytes long, taking up four storage locations. Therefore, the first line of the data structure is the beginning of the data structure in memory. Because "*next" is four bytes long (recognized as a pointer), the next field in the data structure, "options", will be at four bytes after "*next." Put another way, "options" will be stored at the address of "*next" plus an offset equal to the size of "*next". Table 2 shows the offset for each field from the beginning of the MSG_Q data structure.

TABLE 2

Data structure with corresponding address location offsets.

```
typedef struct msg_q           /* MSG_Q */
       {
+0     struct msg_q   *next;          /* next message */
+4     int            options;        /* message queue options */
+8     int            maxMsgs;        /* max number of messages in queue */
+12    int            maxMsgLength;   /* max length of message */
+16    int            maxMsgsQueued;  /* max number of messages queued */
+20    int            sendTimeouts;   /* number of send timeouts */
+24    int            recvTimeouts;   /* number of receive timeouts */
       } MSG_Q;
```

Table 3 shows the different offsets that would result in compiling the same data structure for a MIPS processor. Even though the integer fields are the same size as they are on the Intel processor, the first field, "*next," a pointer to a defined type, is eight bytes long. Because the "*next" field is first, it shifts all the remaining offsets for the integer fields even though the size of the integer fields remain the same.

TABLE 3

Data structure offsets on a different processor.

```
typedef struct msg_q           /* MSG_Q */
       {
+0     struct msg_q   *next;          /* next message */
+8     int            options;        /* message queue options */
+12    int            maxMsgs;        /* max number of messages in queue */
+16    int            maxMsgLength;   /* max length of message */
+20    int            maxMsgsQueued;  /* max number of messages queued */
+24    int            sendTimeouts;   /* number of send timeouts */
+28    int            recvTimeouts;   /* number of receive timeouts */
       }MSG_Q;
```

Data, however, is virtually never placed at the beginning of a memory starting with the first address. Therefore, a pointer is needed to point to the location where data structures begin. The pointer is the address location for the beginning of the data structure. Assume the data structure begins at address location one hundred (100). In this case, the pointer is an integer variable with the value of "100". To access a certain field, its corresponding offset for the field is added to the pointer. Therefore, to access the "sendTimeouts" field, its offset (+20 using Table 2) is added to the pointer (100) to obtain the address location of the start of the sendTimeouts field, 100+20=120.

Returning to the original example of Table 1, assume the field "maxMsgs"—the maximum number of messages in a MSG_Q object—is being retrieved from the data object using a gopher program. The field, "max Msgs," is offset from the beginning of this structure by eight address locations. To construct a gopher program to retrieve the "maxMsgs" field we need to construct a gopher program that would initialize the gopher pointer to the beginning of this structure, advance the pointer by eight locations to the beginning of the "maxMsgs" field and then write the next four locations into the tape. Such a gopher program could be implemented as follows:

MSG_Q_addr<+8@>

"MSG_Q_addr" is a pointer that loads the address location at the beginning of the MSG_Q data structure into the gopher pointer. "<+8@>" is a gopher program comprised of gopher commands that advance the pointer eight locations to the beginning of the "maxMsgs" field ("+8") and writes 4 bytes ("@") to the tape. In the context of the present invention, the term "gopher program" refers to the gopher commands' exclusive of any initial pointer.

The gopher result tape is a byte-packed data stream formatted as a series of pairs, each pair with a type code and its associated data. Assuming the value of maxMsgs is 128, the above gopher program would return the following values in the tape: "0 128" where 128 is the value of that particular "maxMsgs" field and 0 is the gopher type identifier which in this case refers to the integer type.

To retrieve all values from the data structure, the following gopher program could be used:

MSG_Q_addr<+0@><+4@><+8@><+12@><+16@><+20@><+24@> which would return:

| | |
|---|---|
| "0 0x12345678" | -- *next |
| "0 0" | -- options |
| "0 128" | -- maxMsgs |
| "0 12" | -- maxMsgLength |
| "0 10" | -- maxMsgsQueued |
| "0 0" | -- sendTimeouts |
| "0 0" | -- recvTimeouts | where the "0" is the type identifier for integer and the values are arbitrarily chosen for the fields.

If the MSG_Q data structure changes, however, then its corresponding gopher programs would be invalidated and have to be recalculated. Changes to the data structure include adding new fields or changing their type.

For example, if the MSG_Q structure is augmented with a "*prev" field, shown in Table 4, then the gopher-program yields incorrect results. The size of the fields do not change, they are all four bytes, however, adding the "*prev" field at the beginning of the data structure shifts all the following fields by four bytes from those values in Table 2. Referring to maxMsgs, its offset in Table 2 is +8 where, in Table 4, it is +12. Therefore, the previous gopher program, "MSG_Q_addr<+8@>," would not extract the value of maxMsgs. Rather, the value of the field eight address locations (+8) after the beginning of the data structure address would be returned. In the amended data structure of Table 4, the field at "MSG_Q_addr<+8@>" is "options".

TABLE 4

Amended data structure.

```
typedef struct msg_q             /* MSG_Q */
    {
+0      struct msg_q    *next;   /* next message */
+4      struct msg_q    *prev;   /* prev message */
+8      int             options; /* message queue options */
+12     int             maxMsgs; /* max number of messages in queue */
+16     int             maxMsgLength;    /* max length of message */
+20     int             maxMsgsQueued;   /* max number of messages queued */
+24     int             sendTimeouts;    /* number of send timeouts */
+28     int             recvTimeouts;    /* number of receive timeouts */
    } MSG_Q;
```

Additionally, if an existing type is changed, for example, from "int" to "char", then all the offsets will again change. Table 5 illustrates a case where "options" is a character, making its size one byte (padded to two bytes) and therefore, occupying two storage locations in memory. Again, the offsets for the following fields are shifted. It is clear that with each change of the data structure, there is a need for an entirely different gopher program.

TABLE 5

Data structure with changed type.

```
typedef struct msg_q             /* MSG_Q */
    {
+0      struct msg_q    *next;   /* next message */
+4      struct msg_q    *prev;   /* prev message */
+8      char            options; /* message queue options */
+10     int             maxMsgs; /* max number of messages in queue */
+14     int             maxMsgLength;    /* max length of message */
+18     int             maxMsgsQueued;   /* max number of messages queued */
+22     int             sendTimeouts;    /* number of send timeouts */
+26     int             recvTimeouts;    /* number of receive timeouts */
    } MSG_Q;
```

In accordance with an embodiment of the present invention, the generation of gopher programs outlined above is automated by extracting type information to calculate offsets so that each time there is a change in a compound data type (e.g., a data structure), the new offset is automatically substituted into the gopher program. The process is explained below.

The compiled binary image (in 0's and 1's) of a program (usually referred to as object code or object files), when compiled with debug information, includes the field types used in the program with their specifications, such as storage size. Therefore, it is possible to access run-time type information for a binary image without actually running the program. In other words, once a program is compiled and its debugging information is included in the object file, it can be accessed to determine the types of the defined fields in the program's data structures without actually executing the program. After the type information is obtained, other platform specification information, such as the type of compiler and processor, is determined. From the type information and platform specifications, field sizes can be ascertained and the corresponding offsets for data structure fields can be calculated to create the appropriate gopher program.

A "type library" is created including all the data types involved so that the necessary type information is available to calculate the correct offsets. For example, consider the following configuration, assuming that only two types, the integer and character primitive data types, will be used. In the Tornado® development environment with a target system running on a VxWorks® platform, an operating system distributed by Wind River Systems, Inc., the type library could be as simple as:

include "vxworks.h"
include "msgQLibP.h"
int main (int argc, char** argv) {}

The above program has two variables, argc, an integer variable, and argv, a character variable. Compiling the above program with debug information produces a binary image with the integer and character type specifications (storage size) necessary for calculating the corresponding offsets (the type library binary image).

An exemplary embodiment of the present invention will be described with reference to the following configuration: the C programming language is used to code the type library; debugging is accomplished using a Gnu debugger; and a Perl script implements the gopher generator. With this configuration the gopher generator (Perl script) would invoke the Gnu debugger with the compiled, binary image of the type library. The generator sends function calls to the Gnu debugger to evaluate certain pre-defined instructions, or gopher generator commands, such as:

offset_of—returns the offset of a field within a structure sizeof—return the size of a particular type array_size—return the C arraysize of a variable The debugger executes the functions, which examine the type library binary image to determine the size of a field and to determine a field position, and returns both to the generator script. These values are used to calculate the offset of a field within a structure (offset_of), the size of a particular type (sizeof), and the C array size of a global variable (array_size). Other gopher generator commands can also be implemented if desired.

The debug information may be included in the compiled image a number of ways, depending on the compiler used. For example, in the above configuration using the Gnu compiler, a "-g" switch is provided for such functionality.

The text file is read on a line by line basis and each line is scanned for the gopher generator commands: "offset_of", "sizeof", "array_size" outlined above. When a line contains one of these gopher generator commands, the gopher generator calls a corresponding function in the debugger. The debugger then executes the corresponding function and if successfully executed, the results are substituted in the input line. If the function fails, a fatal error is signaled in the input line and the gopher generator exits with an error.

Continuing with our example of extracting the maxMsgs value from the MSG_Q structure, to automatically create a gopher program for retrieving the value of maxMsgs, the following text line from an input command file is input to the gopher generator:

MSG_Q_addr<offset_of(MSG_Q.maxMsgs)@>

When the gopher generator parses the input line, it will see "offset_of," and recognize it as a predefined gopher generator command, and call an offset_of function in the debugger with the argument "MSG_Q.maxMsgs," which tells the function to return the offset of the variable maxMsgs in the data structure MSG_Q. By examining the binary image of the data structure in the type library binary image, the function ascertains that maxMsgs is an integer type, determines the configuration of the MSG_Q data structure, accesses the type information in the compiled binary image of the type library binary image to determine the offsets of each variable in the MSQ_Q data structure, calculates the offset of maxMsgs, and returns the calculated offset value to the generator which then substitutes the offset value to yield the following line in the input command file:

MSG_Q_addr<+8@>

The gopher generator substitutes those gopher generator commands that it recognizes on a line by line basis. This allows the gopher generator to be extended to accommodate new gopher generator commands as and when they become necessary. For example, if an input line contained the following:

text-that-will-remain-before--+offset_of(MSG_Q.maxMsgs)@and-after Period;

the result would be:

text-that-will-remain-before--+8@-and-after Period.

The generator replaces certain specified text, namely, the gopher generator commands, with the appropriate value (e.g., offset value, size value, array size value). This mechanism allows the arbitrary placement of text around the gopher generator command, and allows the use of any gopher program language elements since the gopher generator command elements are defined by the user.

To retrieve all values from the MSG_Q data, the following gopher program could be used:

MSG_Q_addr<+0@><+4@><+8@><+12@><+16@><+20@><+24@>

To automatically generate a gopher program with the correct offsets for retrieving all the data structure values, the following text is input to the gopher generator:

```
MSG_Q_addr   <+offset_of(MSG_Q.next)$><+offset_of(MSG_Q.options)@>
<+offset_of(MSG_Q.maxMsgs)@><+offset_of(MSG_Q.maxMsgLength)@>
<+offset_of(MSG_Q.maxMsgsQueued)@><+offset_of(MSG_Q.sendTimeouts)@>
<+offset_of(MSG_Q.recvTimeouts)@>
```

30

If a gopher generator command included a member that did not exist, for example:

<+offset_of(MSG_Q.thisDoesNotExist)@> then it would produce a run-time error and no gopher program would be generated.

The input text file is preferably pre-processed by the pre-processor. This mechanism allows one file to include another. For example, the MSG_Q data type could be described in its own file. This could then be included by other files that would need access to MSG_Q members. This mechanism promotes the development of a type library. For example, the MSG_Q data structure could be stored in it's own file: "MSG_Q.gp", and from another text file we could simply include it with "#include "MSG_Q.gp."

Figure 2:
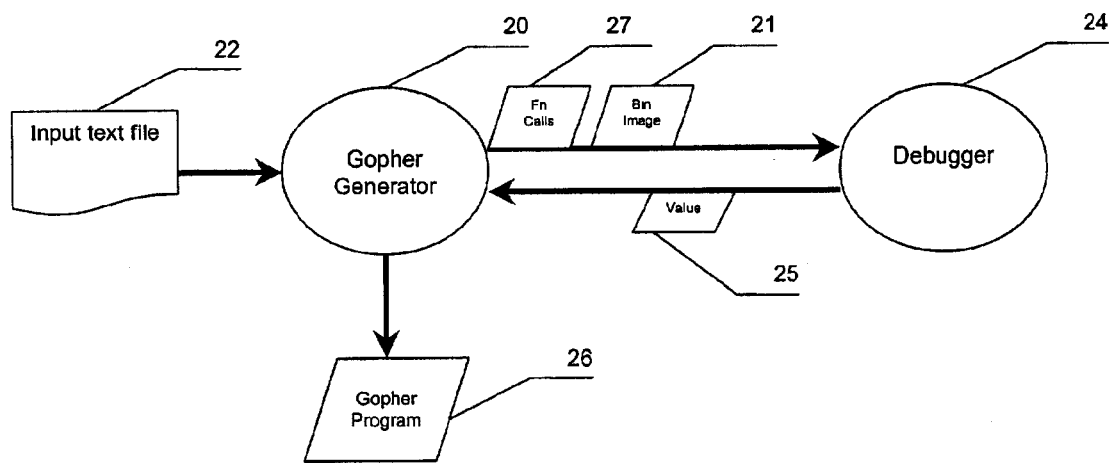
FIG. 2 shows the interaction of the components in a gopher generator according to an embodiment of the present invention.

FIG. 2 shows the interaction of the components of the system according to an embodiment of the present invention. The automatic gopher generator 20 accepts a command file 22 as input. The binary image of the type library 21 is fed to the debugger 24. The text file 22 is parsed for pre-defined gopher generator commands, and if found, the appropriate function call 27 is sent to the debugger 24 which, returns a value 25 that is substituted into the gopher generator command's corresponding position in the text file to produce a gopher program 26. The text file can then be saved under an appropriate file name or printed.

Figure 3:
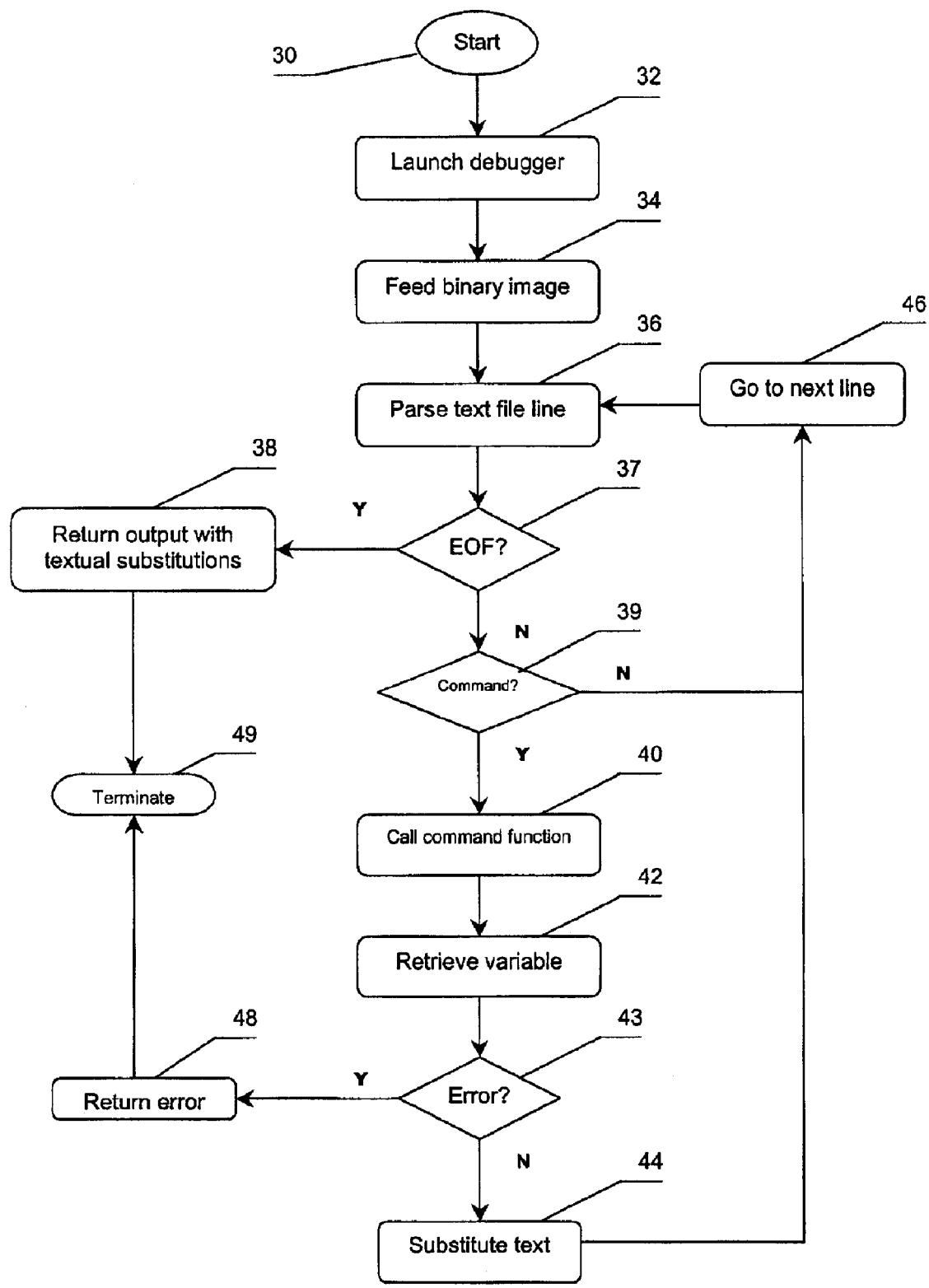
FIG. 3 is a flowchart for the process of a gopher generator according to an embodiment of the present invention.

The process of the gopher program generator is shown in the flowchart of FIG. 3. The generator starts (step 30) by launching the debugging process (step 32) and feeding the type library binary image to the debugger (step 34). The generator then parses the command file line by line (step 36). After parsing a line of the input command file, the generator checks to see if it is at the end of the file (step 37). If so, then the generator returns the output (a gopher program) at step 38. Otherwise, if the generator is not at the end of the text file (step 37), the next step determines if one of the predefined gopher generator commands is present in the line (step 39). If there is not, the generator goes to the next line (step 46) and repeats parsing for the EOF (step 37) and pre-defined gopher generator commands (step 39) until either the EOF or a gopher generator command is found. Once a gopher generator command is found, its corresponding function is called (step 40). The function returns its result (step 42) and the generator determines if the returned result is an error (step 43). If an error is returned, the generator terminates (step 38). If there is a value returned (step 43), it is substituted in the place of the gopher generator command text (step 44). The generator then goes to the next line (step 46) and continues to parse the remainder of the input command file (step 36).

For a more detailed example, suppose that a type library is compiled with debug information, and that the type library binary image is in a file is called employee-type.o. Let us further suppose that the type library contains information regarding the data structure in Table 6.

TABLE 6

Data Structure struct employee_struct
{
int id;
char* firstname;
char* lastname;
};

In addition, an employee.p command file contains the following:

TABLE 7

CommandFile

!<+offsetOf(employee_struct.id)@>
<+offsetOf(employee_struct.firstname)*$>
<+offsetOf(employee_struct.lastname)*$>

The gopher program is invoked via the command line:

perl print-gp.pl employee-type.o employee.p.

Breaking the command line down, "perl print-gp.pl" is the method of running the gopher generator Perl script ("print-gp.pl"). The two subsequent arguments are, respectively: the type library used by the debugger, and the command file that the gopher generator will use. If the type library (employee-type.o) is successfully loaded by the debugger, then the gopher generator program will first pre-process the command file (employee.p). The pre-processing stage will transform all lines that contain: #include <file-name>to the actual contents of the file whose name appears in <file-name>. In this case, for the sake of simplicity, there are no included files.

The gopher generator reads the contents of the now fully pre-processed command file line-by-line while looking for gopher generator commands. In this example, the only command used is "offsetOf", which computes the offset of the given field.

According to the syntax of Perl, each command (in this case, gopher generator commands) in the input command file is followed by an open parentheses "(", and the end of the command with a close parentheses ")". The contents between the "(" and the ")" are the command's parameter. According to general computer programming principles, each command can take a variable number of parameters, including none.

If the input line contains a gopher generator command, then it is transformed according to that command. Taking the lines of "employee.p" one by one, the results are as follows. The first input line is:

!<+offsetOf(employee_struct.id)@> which matches the offsetOf command and gopher generator computes the offset of the id field within the ""employee_struct type"" via the debugger. If the employee_struct type has no id field, then a fatal error occurs and the command file ("employee.p") needs to be corrected. Since the id field does exist, and the rest of the line is copied verbatim, the full substitution for that line is:

!<+0@>

The next input line is:

<+offsetOf(employee_struct.firstname)*$> which also matches the "offsetOf" command and the gopher generator computes the offset of the "firstname" field within the "employee_struct" type via the debugger. In this example, it is clear that the "firstname" field is the second one in the data structure (See Table 6), following the "int id" field. The offset returned by the debugger is the distance from the start of the data structure to the start of the "firstname" field, which is consequently the size of an integer variable. The full substitution for this line is:

<+4*$> wherein "4" is the size of an integer value (in x86), and the "*$" command will later tell the gopher agent running on the target to de-reference the pointer at this offset's location and keep writing string data bytes to the tape until it encounters a terminating null.

The final output line is:

<+offsetOf(employee_struct.lastname)*$> which is the same as the previous command to get the first name, except that now it will use the computed offset of the lastname field. The substituted line is therefore:

<+8*$> as the debugger reports the offset of the struct field to be 8 now (the size of an int, plus the size of a pointer).

Since there are no more input lines from the command file, the gopher generator outputs (in this example, prints to a file or printer via the print-gp.pl command) a gopher program suitable for a gopherEval ( ) via WTX. The gopher program is the result of combining the input lines. For the "employee.p" command file, the generated gopher program is:

!<+0@><+4*$><+8*$>

It should be noted that in most cases, a gopher program is used in conjunction with an initial pointer. In this case, assuming that the employee struct data structure does not begin at memory location zero, a pointer to the beginning the employee_struct data structure on the target would be identified by the user (e.g., from a symbol table), and the pointer plus the above gopher program would be sent to the target via WTX.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for creating a gopher program comprising the steps of:
   compiling a type library with debug information to produce a type library binary image;
   feeding the type library binary image to a debugger;
   parsing an input command file, the input command file having literal text and a pre-defined instruction;
   identifying the pre-defined instruction and a corresponding function in the debugger;
   calling the corresponding function to retrieve a field size from the type library binary image and a field position from the type library binary image to calculate a field value of a field in a compound data type;
   producing a gopher program including the literal text and the field value substituted in place of the pre-defined instruction.

2. The method of claim 1 wherein the field value is an offset value.

3. The method of claim 1 wherein the field value is the field size.

4. The method of claim 1 wherein the field value is an array size.

5. The method of claim 1 wherein the input command file further comprises a plurality of pre-defined instructions.

6. The method of claim 1 wherein the pre-defined instruction is a command.

7. The method of claim 1 wherein the pre-defined instruction is a macro.

8. A gopher program generating method comprising:
   a type library including a plurality of data types, the data types including primitive data types and compound data types;
   an input command file;
   a script; and,
   a debugger having a set of functions, each of the functions corresponding to each of a set of pre-defined instructions;
   wherein the script is constructed and arranged to:
      compile the type library with debug information to produce a type library binary image;
      feed the type library binary image to the debugger;
      parse the input command file, the input command file having literal text and a pre-defined instruction from the set of pre-defined instructions;
      identify the pre-defined instruction and the corresponding function;
      call the corresponding function to retrieve a field size from the type library binary image and a field position from the type library binary image to calculate a field value of a field in one of the data types;
      producing a gopher program including the literal text and the field value substituted in place of the pre-defined instruction.

9. The gopher program generating of claim 8 wherein the field value is an offset value.

10. The gopher program generating method of claim 8 wherein the field value is the field size.

11. The gopher program generating method of claim 8 wherein the field value is an array size.

12. The gopher program generator method of claim 8 wherein the input command file further comprises a plurality of pre-defined instructions.

13. The gopher program generating method of claim 8 wherein the pre-defined instruction is a command.

14. The gopher program generating method of claim 8 wherein the pre-defined instruction is a macro.

15. The gopher program generating method of claim 8, wherein the plurality of data types include a compound data type.

16. An automatic gopher program generating system comprising:
   a processor; and,
   a data storage device operably connected to the processor, the data storage device including a program executable by the processor to:
      compile a type library with debug information to produce a type library binary image, the type library including a plurality of data types;
      feed the type library binary image to a debugger;
      parse an input command file, the input command file having literal text and a pre-defined instruction;
      identify the pre-defined instruction and a corresponding function in the debugger;
      call the corresponding function to retrieve a field size from the type library binary image and a field position from the type library binary image to calculate a field value of a field in one of the data types;
      substitute the field value for the pre-defined instruction in the input command file;
      producing a gopher program including the literal text and the field value in place of the pre-defined instruction.

17. The system of claim 16 wherein the field value is an offset value.

18. The system of claim 16 wherein the field value is the field size.

19. The system of claim 16 wherein the field value is an array size.

20. The system of claim 16 wherein the input command file further comprises a plurality of pre-defined instructions.

21. The system of claim 16 wherein the pre-defined instruction is a command.

22. The system of claim 16 wherein the pre-defined instruction is a macro.

23. The system of claim 16, wherein the plurality of data types include a compound data type.

24. A computer readable medium, having stored thereon, computer executable process steps operative to control a computer, to generate a gopher program, the process steps comprising:
   compiling a type library with debug information to produce a type library binary image, the type library including a plurality of data types;
   feeding the type library binary image to a debugger;
   parsing an input command file, the input command file having literal text and a pre-defined instruction;
   identifying the pre-defined instruction and a corresponding function in the debugger;
   calling the corresponding function to retrieve a field size from the type library binary image and a field position from the type library binary image to calculate a field value of a field in one of the data types;
   substituting the field value for the pre-defined instruction in the input command file;

producing a gopher program including the literal text and the field value in place of the pre-defined instruction.

25. The computer readable medium of claim 24 wherein the field value is an offset value.

26. The computer readable medium of claim 24 wherein the field value is the field size.

27. The computer readable medium of claim 24 wherein the field value is an array size.

28. The computer readable medium of claim 24 wherein the input command file further comprises a plurality of pre-defined instructions.

29. The computer readable medium of claim 24 wherein the pre-defined instruction is a command.

30. The computer readable medium of claim 24 wherein the pre-defined instruction is a macro.

31. The computer readable medium of claim 24, wherein the plurality of data types include a compound data type.

32. A method for automatically generating a gopher program, comprising:

invoking a debugger;

loading a type library into the debugger, the type library containing information regarding a plurality of data types, each data type required to retrieve desired state information from a target computing environment;

reading each line in a command file, the command file including literal text and one or more predefined instructions, and, in each line:

upon encountering literal text, copying the literal text to a gopher program output, upon encountering a predefined instruction:

calling a corresponding function in the debugger, the debugger returning a numerical offset value based upon information in the type library, and copying the numerical offset value to the gopher program output in place of the predefined instruction in the command file.

33. The method of claim 32, wherein the plurality of data types include a compound data type.

34. A method for automatically generating a gopher program, comprising:

invoking a debugger;

loading a type library into the debugger, the type library containing information regarding a plurality of data types used in a program;

reading each line in a command file, the command file including literal text and one or more predefined instructions, and, in each line:

upon encountering a predefined instruction:

calling a corresponding function in the debugger, the debugger returning a numerical offset value based upon information in the type library, and copying each line of the command file to a gopher program output, with each predefined instruction replaced with its corresponding numerical offset value.

35. The method of claim 34, wherein the plurality of data types include a compound data type.

* * * * *